United States Patent Office 2,837,589
Patented June 3, 1958

2,837,589
ACTIVE MATERIAL FOR STORAGE BATTERIES

Otto Konig, New York, N. Y., assignor to National Lead Company, New York, N. Y., a corporation of New Jersey No Drawing. Application July 19, 1954
Serial No. 444,368

6 Claims. (Cl. 136—26)

This invention relates to lead-acid storage batteries and more particularly to an active material composition for the negative plates of such batteries.

It has long been noticed that at high rates of discharge, the low temperature capacity of storage batteries is substantially less than the capacity at normal temperatures. This effect has in part been attributed to the tendency of the active lead compound in the negative plates to coalesce during discharge. To overcome this tendency, a great variety of materials of both organic and inorganic nature have been added to the negative plate material. The materials employed in this manner have generally been called "expanders."

Early in the development of the art, certain naturally occurring substances as straw, comminuted plants, etc., were found to materially increase the low temperature discharge capacity of storage batteries when added to the active material of the negative plates. Later, naturally occurring substances were chemically modified to increase their effectiveness or to isolate the more active constituents in their composition. More recently, known chemical entities in the form of synthetic condensation products have been employed as expanders.

At the present time, the chemically modified natural materials such as humic substances and sulfite liquor residues continue to be the most widely employed expander materials. They are generally more effective than synthetic materials and are very economical due to the abundance of raw material sources. The search for good synthetic expanders, however, has continued to be pursued with considerable interest. One purpose is to discover the principles giving rise to expander action so that ultimately more effective expanders may be developed. Also it is highly desirable that substitute expanders be available should the source material of the natural expanders change in composition or quality or be diverted to other uses. It is with the synthetic expanders that we are concerned.

The principal object of this invention is to provide a novel active material for lead-acid storage batteries.

Another object is to provide an improved synthetic expander for the negative plates of such batteries.

A further object is to provide a negative plate active material incorporating a synthetic expander having an improved low temperature discharge capacity.

In accordance with the present invention it has been discovered that the low temperature discharge capacity of storage batteries may be substantially increased by employing as an expander in the negative active material a water soluble salt of a sulfonated phenol-formaldehyde condensation product. This water soluble salt of a sulfonated phenol-formaldehyde condensation product is employed in the active material for negative plates in much the same way as prior art expander materials. Accordingly, it may be added to the dry lead oxide materials or to the active material paste.

The water soluble salts of sulfonated phenol-formaldehyde condensation products of this invention may be prepared by condensing sulfonated phenolic compounds with formaldehyde to produce a sulfonated phenol-formaldehyde condensation product followed by neutralization with an alkali hydroxide to make the alkali salt of the condensation product. The sulfonated phenolic compounds suitable as starting materials include sulfonated phenol, cresols, naphthols, hydroxybenzoic acids and polyhydroxyphenols.

The condensation reaction is conducted by reacting an aqueous solution of the phenolsulfonic acid with an aqueous solution of formaldehyde. Due to the vigorous nature of this reaction it should be kept under control during the addition of formaldehyde. This is most conveniently accomplished by adding the formaldehyde solution gradually while at the same time cooling the reaction vessel. The mol quantities of formaldehyde should equal or exceed those for the sulfonated phenol. The mol ratio of formaldehyde-to-sulfonated phenol will therefore be at least 1:1 or greater. Generally, the condensation reaction should be conducted for a part of the time at temperatures above 70° C., preferably between 95–110° C. The reaction conditions are maintained until a solid, dark, water-soluble condensation product forms. Thereafter, the condensation product is suspended or dissolved in water and neutralized with an alkali hydroxide to form a water-soluble alkali salt of a sulfonated phenol-formaldehyde condensation product.

Alkali salts of sulfonated phenol-formaldehyde condensation products may also be prepared by starting with the simple phenolic materials. According to this procedure the phenols are reacted with sulfuric acid to form the sulfonated phenol. The sulfuric acid-to-phenol mol ratio should be between about 1–1.5. Such ratios will insure the production of phenols that are substantially mono-sulfonated or higher. The condensation of the sulfonated phenols with formaldehyde may then be conducted according to the procedure described above. As a further alternative method for the manufacture of the synthetic expander products of this invention, phenols may be condensed with formaldehyde directly. According to this method phenols would be reacted with formaldehyde employing the same mol proportions as outlined for the sulfonated phenols. The resulting phenol formaldehyde condensation product would then be sulfonated according to well known procedures and thereafter neutralized with an alkali hydroxide to make an alkali salt of a sulfonated phenol-formaldehyde condensation product. The condensation product may readily be recovered in any of the foregoing procedures by evaporating the aqueous solution to dryness and further drying the residue at elevated temperatures of preferably 95–105° C. and grinding the dry product to a fine powder.

The following examples describe the preparation of the alkali salts of sulfonated phenol-formaldehyde condensation products. The preparation of other materials of somewhat related chemical structure are also described and the effectiveness of all of the products as expanders compared in Table I:

I

*Sodium salt of ortho-cresolsulfonic acid-formaldehyde condensation product*

216 grams of ortho-cresol (2.0 mol) were melted and treated with 96% sulfuric acid in small additions until 120 ml. (2.16 mol) had been added. After all additions, the sulfonation reaction was continued at room temperature for 12 hours and then at 105° C. for 6 hours. The sulfonated cresol product was diluted with 150 ml. of water and reacted with small additions of formaldehyde. In all, 170 grams of 37% formaldehyde (2.0 mol) were added. During the formaldehyde additions the reaction mixture was cooled to keep the speed of reaction under control. After completion of the formaldehyde additions, the temperature of the reaction mixture was maintained at 70° C. until the product turned black. This product was dissolved in water, neutralized with sodium hydroxide and the resulting solution evaporated to dryness. The product obtained was a water soluble, friable, dark brown material.

II

Sodium salt of ortho-cresolsulfonic acid-formaldehyde condensation product 1728 grams of ortho-cresol (16 mol) were reacted with 960 ml. of 96% sulfuric acid (17.3 mol). The acid was added in 100 ml. portions with shaking and cooling. The reaction mixture was cooled in water for 3 hours and then heated to 105° C. for 16 hours. The cresol sulfonate was cooled, dissolved in 1.8 liters of water and reacted with formaldehyde. 1088 grams of 37% formaldehyde (12.8 mol) were added to the reaction mixture while the temperature of the mixture was below 50° C. The mixture was then heated to 75° C. and 272 grams of formaldehyde added (3.2 mol). After 45 minutes at 75° C. the product turned black and set to a solid. This product was dissolved in 6 liters of water containing 1220 grams of (30.5 mol) sodium hydroxide. Upon evaporation the final product obtained was a water soluble, friable, dark brown material.

III

Sodium salt of meta-cresolsulfonic acid-formaldehyde condensation product 216 grams of metacresol (2 mol) were mixed with 120 ml. of 96% sulfuric acid (2.16 mol) and the mixture heated at 105° C. for 16 hours. The mixture was diluted with 100 ml. of water, cooled and reacted with 148 grams of 37% formaldehyde (1.74 mol). After addition of formaldehyde, the mass was heated on a hot plate causing the settling out of a rubbery cake of sulfonated cresol formaldehyde condensation product. Heating was continued on a steam bath for four hours, then the mixture was removed to stand at room temperature overnight. The reaction product was dissolved and neutralized in aqueous sodium hydroxide and the mixture evaporated to dryness. The product was water soluble, brown and of a crumbly nature.

IV

Sodium salt of phenolsulfonic acid-formaldehyde condensation product 63 grams of phenol (0.67 mol) were mixed with 37 ml. of 96% sulfuric acid (0.66 mol) and heated at 105° C. for 6½ hours. The reaction product stood at room temperature for 2 days during which time the product became solid. The product was dissolved in 333 ml. of water and reacted with 54 ml. of 37% formaldehyde (0.66 mol). The reaction mixture was heated on a boiling water bath for 1½ hours. A portion of the condensation product separated out and was filtered off. The filtrate containing a major portion of the phenol sulfonic acid-formaldehyde condensation product was neutralized with a solution of sodium hydroxide and evaporated to dryness. The product was a water soluble solid.

V

Sodium salt of pyrogallolsulfuric acid-formaldehyde condensation product 126 g. of pyrogallol (1 mol) were mixed with 105 g. of concentrated sulfuric acid (1 mol) in a flask and heated at 105° C. for 24 hours. 100 ml. of distilled water were added. When the aqueous solution cooled to room temperature 85 g. of 37% formaldehyde (1 mol) were added slowly. The exothermic reaction was controlled by cooling and the mixture allowed to stand at room temperature overnight. The solid product was broken up and added to a liter of distilled water. 80 g. of sodium hydroxide (2 mol) in 200 ml. of water were added neutralizing the solution. The solution was evaporated yielding a dark brown, water-soluble solid.

VI

Sodium salt of naphtholsulfonic acid-formaldehyde condensation product 72 g. of alpha-naphthol (0.5 mol) were mixed with 72 g. of concentrated sulfuric acid (0.75 mol) in a flask and the mixture heated on a water bath for 16 hours. The product was dissolved in 250 ml. of water and 40.6 g. of 37% formaldehyde (0.5 mol) added slowly with cooling. Immediately after the formaldehyde additions the solution was neutralized with a caustic soda solution and then evaporated on a water bath and dried at 105° C. The product was a water-soluble, brittle solid.

VII

Sodium salt of sulfosalicylic acid-formaldehyde condensation product 250 g. (1.84 mol) of salicylic acid were condensed with 900 ml. of 37% formaldehyde (6 mol) in the presence of a catalyst, 100 ml. of dilute sulfuric acid (1:6), and by contacting the container with boiling water for 50 hours. A resin separated and was dried over a water bath for 8 hours. 100 ml. of concentrated sulfuric acid (1.8 mol) were added, and heating continued for 8 hours. This product was dissolved and neutralized in an aqueous solution of sodium hydroxide, the solution evaporated to dryness and the residue dried at 105° C. The expander product was a water-soluble, black, brittle material.

Expander materials of related composition:

A

Sodium ortho-cresolsulfonate 220 grams of ortho-cresol (2 mol) were reacted with 120 ml. of 96% sulfuric acid (2.16 mol). The mixture was maintained at 105° C. for 6½ hours. The mixture was cooled and kept at room temperature for 2½ days at which time it solidified to a pink cake. The product was dissolved in water, neutralized with sodium carbonate and evaporated to dryness. The final product was a pink white powder.

B

Ortho-cresol-formaldehyde condensation product

To 108 g. (1 mol) of orthocresol in a flask were added 75 g. (0.92 mol) of 37% formaldehyde and 5 mol of dilute sulfuric acid (1:6). The mixture rapidly heated to a boiling temperature and was immediately cooled under water. After cooling and completion of the exothermic reaction, the mixture was reheated on a water bath until a very viscous layer had settled to the bottom of the flask. This viscous layer was separated and dissolved in 165 ml. of 6 N sodium hydroxide solution with warming. The resulting neutral solution was evaporated on a water bath and dried at 105° C. Drying was completed in a desiccator over calcium chloride.

C

Phenolsulfonic acid-formaldehyde condensation product 63 grams of phenol (0.67 mol) were mixed with 37 ml. of 96% sulfuric acid (0.66 mol) and heated at 105° C. for 6½ hours. The reaction product stood at room temperature for 2 days during which time the product became solid. The product was dissolved in 333 ml. of water and reacted with 54 ml. of 37% formaldehyde (0.66 mol). The reaction mixture was heated on a boiling water bath for 1½ hours. A portion of the condensation product settled out of solution and this was separated and dried.

The active material of this invention will be comprised substantially of an active lead compound and a minor proportion of the expander material. The active lead compound will generally consist of litharge which as normally used, contains appreciable amounts of metallic lead. This active lead compound may also consist of other oxides of lead as, for example, red lead. Active material compositions for negative plates may additionally contain minor proportions of blanc fixe and carbon black as will be understood by those skilled in the art.

The expander or alkali salt of the sulfonated phenol formaldehyde condensation product should constitute about 0.1 to 1% by weight of the active material composition. Less than 0.1% is inadequate for good capacity and amounts in excess of 1% interfere with the paste characteristics and performance of the battery. It has been found preferable to employ about 0.4% of the organic expander in the active material composition.

A further embodiment of this invention contemplates the provision of an active material concentrate containing substantially higher proportions of the expander additive in the mixture. Such concentrates are particularly convenient for distribution to storage battery manufacturers who prefer to employ a lead oxide from other sources. These manufacturers merely dilute the lead oxide concentrate to arrive at proper active material compositions for incorporation in the battery. While the composition of the active material concentrate is not critical it will generally not contain more than about 10% of the expander.

To illustrate the practice of this invention, the materials described in the above examples were employed in negative plate active material compositions. The active lead compound was litharge containing about 28% metallic lead. The indicated expander was thoroughly dry blended with the litharge to make an active material composition containing 0.4% expander by weight. These compositions were then worked into pastes by the addition of dilute sulfuric acid. The pastes were pressed into grid structures, and the resulting plates dried, assembled into storage batteries and formed according to conventional procedures. The effect of the expander materials was determined by means of low temperature capacity tests. These were conducted at 0° F. at a discharge rate of 300 amperes. The measure of the capacity was taken as the number of minutes the discharge could be sustained under these conditions. The initial capacity was taken after 2 cycles and the sustained capacity taken after 130 cycles except in Examples 1, 2 and 7 where the sustained capacity was taken after 200 cycles.

ACTIVE MATERIAL COMPOSITIONS CONTAINING 0.4% OF THE FOLLOWING EXPANDERS

|  | Capacity in Minutes | |
|---|---|---|
|  | Initial Capacity | Sustained Capacity |
| Expanders of the invention: | | |
| I. Sodium Salt of Ortho-Cresolsulfonic Acid-Formaldehyde Condensation Product | 3.80 | 4.42 |
| II. Sodium Salt of Ortho-Cresolsulfonic Acid-Formaldehyde Condensation Product | 3.99 | 4.96 |
| III. Sodium Salt of Meta-Cresolsulfonic Acid-Formaldehyde Condensation Product | 3.88 | 3.89 |
| IV. Sodium Salt of Phenolsulfonic Acid-Formaldehyde Condensation Product | 3.69 | 1.94 |
| V. Sodium Salt of Pyrogallolsulfonic Acid-Formaldehyde Condensation Product | 3.96 | 3.72 |
| VI. Sodium Salt of Naphtholsulfonic Acid-Formaldehyde Condensation Product | 3.56 | 3.88 |
| VII. Sodium Salt of Sulfosalicylic Acid-Formaldehyde Condensation Product | 3.80 | 4.40 |
| Other expander materials: | | |
| A. Sodium Ortho-Cresolsulfonate | 2.31 | .99 |
| B. Ortho-Cresol-Formaldehyde Condensation Product | .97 | |
| C. Phenolsulfonic Acid-Formaldehyde Condensation Product | 1.49 | .86 |

The foregoing examples and description illustrate the practice of this invention. It will be seen that synthetic expanders of the class comprising water soluble alkali salts of condensation products of formaldehyde and sulfonated phenolic compounds are highly effective for improving the low temperature capacity of storage batteries. Furthermore, these expanders are effective not only during the initial life of the battery but also after the battery has been aged or cycled many times. In some instances, the alkali salts of phenolsulfonic acid-formaldehyde condensation products actually become more effective expanders during cycling of the battery.

The foregoing examples and description are for purposes of illustration only and no undue limitation should be deduced therefrom.

I claim:

1. A composition for use as active material in storage battery plates comprising lead oxide and about 0.1 to 1% by weight of said composition of an alkali salt of a condensation product of formaldehyde and a sulfonated phenolic compound.

2. A composition for use as active material in storage battery plates comprising lead oxide and about 0.1 to 1% by weight of said composition of an alkali salt of a condensation product of formaldehyde and a sulfonated cresol compound.

3. A composition for use as active material in storage battery plates comprising lead oxide and about 0.1 to 1% by weight of said composition of an alkali salt of a condensation product of formaldehyde and a sulfosalicylic acid compound.

4. A composition for use as active material in storage battery plates comprising lead oxide and about 0.1 to 1% by weight of said composition of an alkali salt of a condensation product of formaldehyde and a sulfonated naphthol compound.

5. The method of making a composition adapted for use as active material in storage battery plates which comprises the steps of reacting a starting mixture of a sulfonated phenolic compound and formaldehyde, the mole ratio of formaldehyde to sulfonated phenolic compound being at least 1:1, continuing said reaction until a dark condensation product forms, adding an alkali hydroxide solution to said condensation product in amount sufficient to neutralize the same, evaporating said solution to dryness to produce an alkali salt of a sulfonated phenolformaldehyde condensation product, and incorporating a minor proportion of said alkali salt into a major proportion of lead oxide.

6. A method of preparing a composition adapted for use as active material in storage battery plates which comprises the steps of reacting a starting mixture of a phenolic compound and formaldehyde, the mole ratio of formaldehyde to phenolic compound being at least 1:1, thereby producing a phenol-formaldehyde condensation product, sulfonating said condensation product, adding an alkali hydroxide solution to said sulfonated condensation product in amount sufficient to neutralize the same, evaporating said solution to dryness to produce an alkali salt of a sulfonated phenolic condensation product, and incorporating a minor proportion of said alkali salt into a major proportion of lead oxide.

References Cited in the file of this patent

UNITED STATES PATENTS

| 2,108,748 | Harner I | Feb. 15, 1938 |
| 2,136,241 | Harner II | Nov. 8, 1938 |
| 2,514,415 | Rasch | July 11, 1950 |
| 2,665,323 | McFarlane et al. | Jan. 5, 1954 |

FOREIGN PATENTS

| 20,596 | Great Britain | of 1894 |

OTHER REFERENCES

"Addition Agents for Negative Plates" by Everett J. Ritchie, The Elec. Chem. Soc., Reprint 92—34, 1947.